INVENTOR.
William R. Dryg
Charles N. Standing

United States Patent Office 3,787,597
Patented Jan. 22, 1974

3,787,597
CONTINUOUS PROCESS FOR PREPARING
RELATIVELY DENSE BAKERY GOODS
William R. Dryg, Tofte, and Charles N. Standing, Minneapolis, Minn., assignors to The Pillsbury Company, Minneapolis, Minn.
Filed Nov. 26, 1971, Ser. No. 202,488
Int. Cl. A21d 13/08, 13/00
U.S. Cl. 426—496
8 Claims

ABSTRACT OF THE DISCLOSURE

Dense bakery goods such as brownies, cocoanut bars, cookies, are prepared by mixing together dough ingredients and passing the mixed dough continuously through a cooker in which mixing is carried out during heating until the product reaches a temperature on the order of at least 200° F. to give the product a cooked or baked character. If the product is to be porous, pressurized gas is introduced either before or after heating. In the second stage of the process, the cooked material is unified by placing relatively large pieces on a flat supporting surface where the product is held in a quiescent condition as its consistency becomes firm. Its exposed surface can be treated by the application of heat to provide a dried surface crust similar to that which forms when bakery goods are oven-baked conventionally.

FIELD OF THE INVENTION

This invention relates to the production of bakery goods which are relatively dense by contrast with bread or cake. Examples of these bakery products are cookies, pie crusts and bar products such as brownies, pecan bars, cocoanut bars, date bars and the like.

THE PRIOR ART

The invention is directed toward the preparation of ready-to-eat bakery products without the requirement for a bulky, high cost conventional baking oven which may be 300 feet long and which often requires a cooling tunnel of about the same size. Not only is this equipment expensive and bulky, its operation drives off a good deal of moisture thereby increasing production costs.

It has been previously proposed to cook breakfast cereal flakes on a continuous basis by pumping a cereal slurry through an elongated heating exchanger (Patent No. 3,458,321). The process, however, produces thin, dried breakfast cereal flakes. Moreover, there is no suggestion to impart tender eating characteristics to the finished product or is there an indication that such a result could be accomplished.

It has also been previously proposed to produce bread on a continuous basis by mixing the bread ingredient with gas under pressure and extruding the bread into a continuously advancing baking enclosure into which the batter is allowed to expand as heat is applied, e.g. by the use of a dielectric field. These processes, are, however, suited for raised products and require special electronic cooking equipment. Moreover, bread products of this kind have a porous and elastic crumb structure resulting from cooking a gas expanded dough while the dough is undisturbed which is not the case for the products of this invention.

OBJECTS OF THE INVENTION

The primary objects of the present invention are: (a) the provision of an improved process for producing bakery goods such as brownies, food bars and cookies which are completely cooked while totally enclosed and are released in a plastic condition capable of becoming more firm upon being expelled from the cooker, (b) the provision of a new system for preparing bakery goods which does not require an expensive band oven typically two or three hundred feet in length, (c) the production of products having an attractive and natural appearance similar to conventionally prepared products, (d) the provisions of an improved process of the type described in which delicate flavor components are not damaged, (e) to make possible simultaneous mixing and cooking with a provision for forming a skin or crust on the top of the finished product, (f) a provision for cooking and mixing the product while confined and for applying supplemental heating after the product is in a quiescent condition, (g) a provision for reducing production costs by eliminating leavening materials which would otherwise be required.

THE FIGURES

Figure 1:
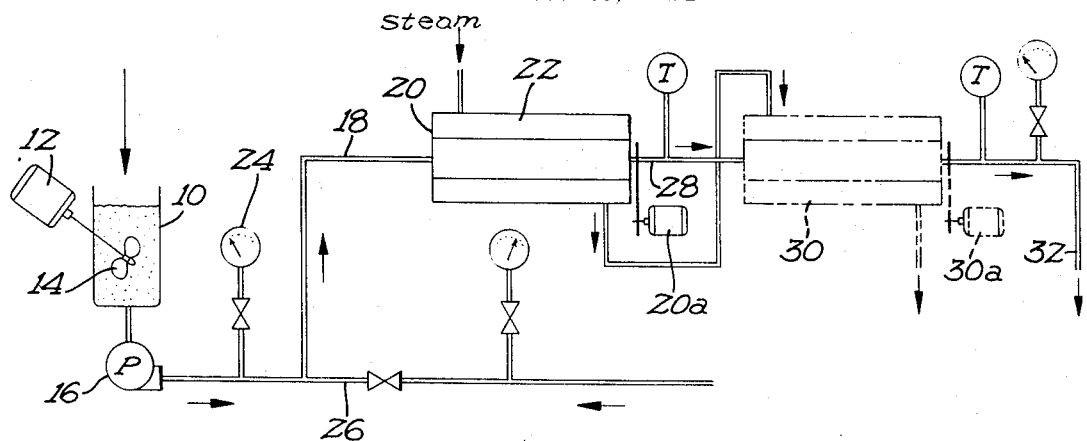
Figure 2:
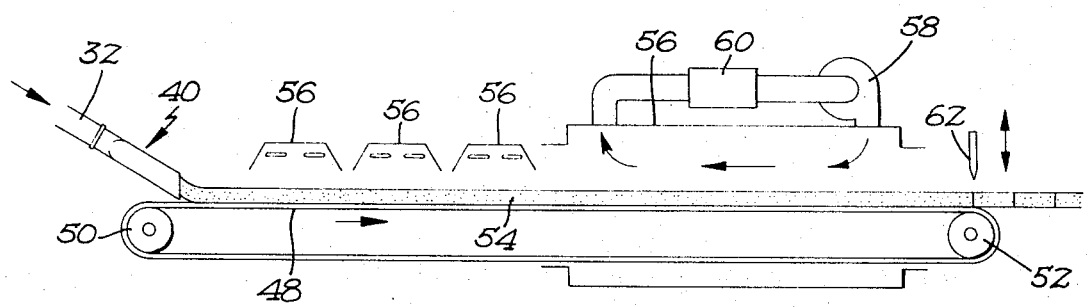
Figure 3:
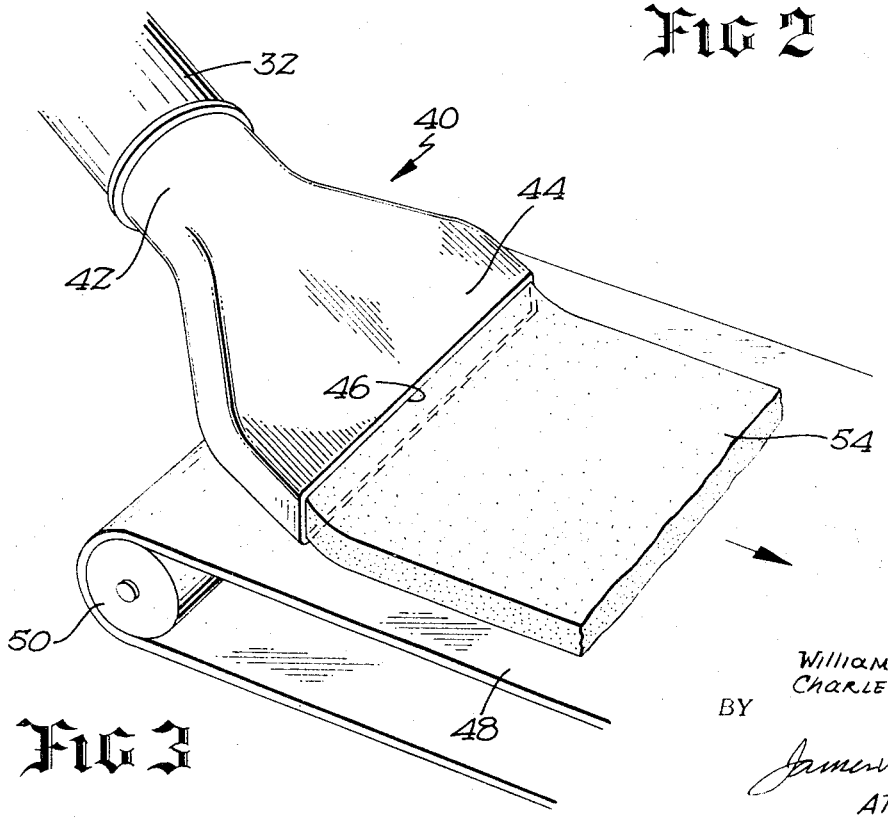

FIG. 1 is a semi-diagrammatic schematic view of a portion of an apparatus for carrying out the invention.
FIG. 2 is an elevational view of a downstream portion of the apparatus.
FIG. 3 is an illustration of the extrusion nozzle on an enlarged scale.

SUMMARY OF THE INVENTION

Dense, relatively structureless bakery goods, e.g. brownies, cocoanut bars, cookies, etc. are prepared by heating the ingredients in a mixing vessel. Mixing is carred out during the heating until the product reaches a temperature on the order of at least 200° F. to give the product a cooked or baked character. If the product is to be porous, pressurized gas is introduced either before or after heating. In the second stage of this process, the cooked material is unified. Unification of the finished product is accomplished by placing relatively large pieces on a flat supporting surface, e.g. an endless conveyor belt where they are held in a quiescent condition as the firmness increases. Exposed surfaces can be treated by the application of heat to provide the dried surface crust similar to that which forms when bakery goods are oven-baked conventionally.

DESCRIPTION OF THE PREFERRED EMBODIMENT

The present invention has application to relatively dense bakery goods that do not have a well-defined crumb structure, i.e. the structure is not well fixed since it retains some liquid or plastic properties. By the term "relatively dense" is meant a density of from about .5 to 1 or more gm./cc. The dough is made up of flour or starch, fat and saccharides. Other conventional bakery ingredients e.g. eggs, butter, flavors, etc. can be used as required. The flour can be any of the flours commonly prepared from cereal grains including wheat flour, corn flour, etc. The fat can be any food shortening of animal or vegetable origin either solid or liquid.

The saccharides can comprise sucrose, corn syrup, corn sugar, other mono or disaccharides or mixtures thereof. One suitable saccharide composition consists of 1 part corn sugar, 5 parts sucrose and 4 parts corn syrup. Unless otherwise stated, all quantities presented herein are expressed in parts by weight.

The starch contained in the flour is gelatinized to a relatively minor extent up to about 20%, usually about 5% when cooked. Finished products are exemplified by brownies, date bars, cocoanut bars, pecan bars, fig bars and cookies but are not limited to these products.

For each 10 parts of the composition a typical formulation consists of about 3 to 6 parts saccharides, about 1 to 3 parts of flour and about 1 to 3 parts of shortening. All these quantities are determined on a dry basis. Optionally, suitable flavoring materials are used as well as any of a variety of additives which are customarily employed in bakery products such as egg whites, etc. Water is added to dry ingredients to provide a moisture content of from about 10 to 30% and preferably from about 15 to 20% by weight of the batter.

The moisture content of the product is set at a level which will allow cooking to be accomplished i.e. starch gelatinization and protein denaturation as well as providing sufficient moisture to give the finished product the proper chewing and eating characteristics. Thus, one important aspect of the invention is to provide a predetermined quantity of moisture in the batter and prevent the escape of all but an insignificant fraction of the moisture during and after the cooking operation. Thus, it has been discovered that the moisture content of the batter as well as the finished product should be set at between about 1 and 3 parts of the finished product and preferably on the order of from 1.5 to 2 parts for each 10 parts of finished product. Outstanding results were accomplished in the case of brownie products with a moisture content of about 19%. This amount of moisture not only enables cooking to take place but also gives the finished product the proper eating qualities.

After the batter is mixed, cooking is carried out in a closed vessel preferably by passing the dough continuously through the vessel. Mixing is carried out as the product is heated in the vessel. The product is heated to a temperature on the order of at least 200° F. to give it a cooked or baked character. If the product is to be porous, gas is introduced either before or after cooking. In the second stage of this process, the cooked material is unified by placing relatively large pieces on a flat supporting surface, e.g. an endless conveyor belt where the product is held in a quiescent condition and becomes more firm.

As mentioned briefly above, the cooking operation is carried out relatively rapidly compared with oven baking. Baking can usually be accomplished in less than 5 minutes but normally more than one minute. The batter is mixed while it is cooked. It was found that it is not merely the brief exposure of the product to a high temperature heat transfer medium that is effective in achieving the desired results nor is it the agitation of the batter while it is totally enclosed that makes the invention a success. Both are required to accomplish the desired results.

Mixing can be carried out in various ways, e.g. in a mixing kettle having steam heated walls, or in a sigma blade mixer or other heated mixing vessels known to the art. It is preferred to cook the product by passing it continuously through a closed vessel of the kind in which the batter which contacts the heated surfaces is removed continuously and mixed with the portion of the batter that is more remote from the heated portions of the cooker. One excellent cooker of this kind is a scraped surface heat exchanger consisting of an elongated cylindrical housing provided with a steam jacket and an axially extending rotor to which one or more scraper blades is attached for continuously removing product from the inside cylindrical surface of the cooker. As the material is continuously removed by the scraper blade, it is mixed with the cooler portion of the product that is more remote from the heated walls of the mixer thereby promoting temperature uniformity throughout the mass as it is brought to cooking temperature.

Another important aspect of the invention is that the consistency of the cooked batter, when expelled, consists of a plastic mass that is capable of holding its shape. The finished bar can vary from about ¼ of an inch thick to about an inch or two in thickness or more. It is normally at least several inches wide. In large scale production the extruded sheet is usually many inches wide.

As mentioned briefly above, cooking is carried out while the product is totally enclosed with mixing being continued during the entire cooking process. While the reason for the success of the invention is not known with certainty, it appears to be due in large part to the continuous mixing of the product throughout the entire cooking cycle and to the subsequent unification of the shapeless plastic product by holding the freshly cooked product in a quiescent condition while it cools, and it is during this unification period of from several minutes to hours that its texture becomes more firm, probably in large part as a result of the cooling but also to some extent as a result of incidental moisture loss, changes in protein state, and the setting of the gelatinized starch. If the product is not capable of assuming and holding its extruded shape, less moisture should be used but in the event the moisture content cannot be reduced because it impairs the chewing characteristics, formulation changes can be made; for example, any of the well-known edible gelling or firming agents can be employed such as the edible food gums.

Gas when injected is preferably used in the amount of about 5% to 50% by volume of the finished product. Any of various food compatible gases can be used including nitrogen, carbon dioxide or any of the noble gases. Gases containing oxygen are not preferred because of their chemical reactivity. Nitrogen gas performed particularly well in preparing brownies when used in the amount of about 20% by volume. Although not essential, the best results have been achieved by admixing the gas with the batter prior to passing the mixture through the scraped surface heat exchanger. In the alternative, the gas can be introduced with vigorous mixing just before the product is extruded.

After the product has been shaped, the next step is to unify the product. This is accomplished by placing the product as extruded on a suitable supporting surface which will enable it to become firm in a quiescent condition. This can be conveniently carried out by extruding the product on a horizontal supporting surface such as an endless belt which is moved at the same speed as the cooked batter issued from the nozzle.

A preferred optional step used in connection with certain embodiments of the invention is the application of supplemental surface heating, e.g. radiant heat to the surface of the extruded bars to provide a crust or skin on at least one exposed surface after extrusion. Another optional step is the provision of refrigeration equipment for forced cooling.

The invention will be better understood by reference to the drawings and the following examples.

A batter composition was made up as illustrated in FIGS. 1–3 using the following formula in which quantities are expressed in percent by weight.

EXAMPLE I

| Formula: | Percent by weight |
|---|---|
| Corn sugar (dextrose) | 4.00 |
| Sugar (sucrose) | 16.84 |
| Corn syrup (consisting of 71% dextrose, 29 water) | 11.81 |
| Invert syrup (consisting of 35% dextrose, 30% water, 35% fructose) | 11.81 |
| Flour | 18.74 |
| Cocoa | 5.50 |
| Salt | 0.50 |
| Soda | 0.03 |
| Vanilla | 0.03 |
| Whole egg, dried | 3.00 |
| Water | 9.00 |
| Shortening | 16.40 |
| Potassium sorbate | 0.10 |
| Oil, cottonseed | 2.24 |
| Total | 100.00 |

The batter was preheated in a jacketed open-top mixer 10 to a temperature of about 110° F. Mixing of the batter was accomplished by means of a motor 12 to which is secured a mixing blade 14. The material was then transferred by a pump 16 through line 18 to a scraped surface heat exchanger 20 having a jacket 22 heated to a temperature of about 240° F. The metering pump 16 accurately controls the rate of which the material passes through the continuous cooker and the rate of which it is expelled onto a supporting belt to be described below. The heat exchanger in this instance was a jacketed unit sold under the name Votator by the Chemetron Corporation of Louisville, Ky. The Votator is run at about 500 r.p.m. by the motor designated as 20A. The rotor should turn at a speed of about 200 to 650 r.p.m. If desired, a second Votator unit 30 driven by motor 30a can be used for longer cooking times. The cooking vessels 20 and 30 have openings only at the inlet and outlet ducts and therefore can be thought of as closed vessels since they are not open to the atmosphere.

Thus, the material at the periphery is scraped from the inside surface of the cooker at least about 3 times per second and mixed with the cooler material. A pressure gauge 24 upstream of the Votator registered a pressure of about 35 p.s.i.g. Nitrogen was injected into line 18 through a line 26 at a pressure in excess of 35 p.s.i.g. A sufficient quantity was injected to bring the final gas content to about 20% by volume. After the process came to equilibrium the product entering the cooker was at about 90° F. The product left the cooker at a temperature of about 225° F. and at atmospheric pressure. The total retention time in the cooker was two minutes.

From the cooker the product was passed through line 32 to an extrusion nozzle 40 having an inlet port 42 and a widened nozzle section 44 terminating in an extrusion orifice 46 which is many times wider than its height. The orifice 46 has a height of at least a quarter of an inch and may be several inches or several feet wide depending upon a capacity of the equipment.

The finished brownies are plastic when extruded but are capable of assuming and holding their extruded shape.

EXAMPLE II

Brownies are prepared as in Example. From the nozzle 40, the brownies are expelled onto a support which comprises the stainless steel belt 48 supported by rolls 50 and 52 which carry the finished product 54 beneath three infra-red emitters 56 that heat the surface of the extruded material sufficiently to form a crust or skin. The product 54 then moves into a cooler 56 to which refrigerated air is supplied by a blower 58 which is connected in series with a heat exchanger 60. The product is then cut to the desired length by a suitable reciprocating cutting knife 62 and is packed for shipment or storage.

A summary of the results obtained in several runs is as follows:

It was found the cooling time had little effect upon product quality while the degree of aeration was found to have little effect except for the relatively uncooked products heated to 200° F. For these products, a 40 percent gas content level produced a somewhat bubbled surface on the product which was absent in the non-aerated samples.

The most important variable for obtaining a satisfactory product was found to be the temperature. At a cook temperature of 200° F. and at a retention time of 5.2 minutes the product was found to be uncooked to a degree similar to that obtained using the shorter 2 minute retention time. At 225° F., products at both 2.0 and 3.6 minute retention times were judged to be somewhat cooked and similar to conventional brownies, and at a cook temperature of 250° F. the products at retention times of 2.0 minutes tended to be overcooked but similar to conventional brownies, while at 250° F. and 5.2 minutes, the products were very much overcooked and were somewhat crumbly.

The degree of starch gelatinization as a function of temperature was estimated. These estimates placed the percent gelatinized starch at 0% when heated to 200° F., 5% at 225° F. and 90% at 250° F. Starch gelatinization is approximately 5% for conventionally produced brownies.

Comparing the products prepared at 200° F. and 250° F., those of the higher temperature were considerably darker in color, more chewy, less glossy, more oily, and more similar to conventional brownies than the 200° F. products. There was virtually no moisture bake-out in the brownies, except for an overcooked product run at 250° F. and long holding time (5 minutes). All products were found to be quite dense, with densities running approximately 1.25 to 1.30 g./cc. (batter densities were about 1.0 g./cc.). Batter (or product) moisture level was found to have little effect on response variable such as glossiness and similarity to conventional brownies.

EXAMPLE III

Products are prepared in accordance with Example II except that cocoanut flavoring and shredded cocoanut meat is used in place of the cocoa.

EXAMPLE IV

The process is carried out as Example II except that chopped pecans and pecan flavoring is used in place of cocoa.

EXAMPLE V

The process is carried out as in Example II with dates being substituted for cocoa and for 25% of the sugar.

EXAMPLE VI

Sugar cookies are prepared as in Example II using the following formulation:

| Formula: | Percent by weight |
|---|---|
| Granulated sugar (sucrose) | 26.35 |
| Flour | 43.92 |
| Mace | 0.09 |
| Salt | 0.55 |
| Soda | 0.37 |
| Whole egg | 5.86 |
| Shortening | 11.71 |
| Milk | 10.25 |
| Baking powder | 0.90 |
| | 100.00 |

In this case, the infra-red heater 56 is operated so as to remove a greater percentage of the moisture present in the extruded and cooked cookie product after it has been deposited on the belt 48.

The present invention provides a system for producing relatively dense bakery goods that have little structure with substantial economies being realized through the use of simplified manufacturing equipment and an elimination of large ovens which are normally employed as well as in reducing the usual moisture loss experienced with such ovens. The product is quite dense, normally about 1 gram/cc. While the baked structure has some porosity, particularly if gas is injected, it is closer in character to a plastic mass than to the porous crumb structure of cake or bread products. It should be noticed that the product is agitated and totally enclosed while it is being cooked and is unified in a quiescent state following cooking. Moreover, the finished product is of a large size, being at least several inches in one dimension unless of course it is cut by the provision of wires or bars within the extrusion nozzle itself and that the relatively large extruded product is immediately unified on a suitable support. It can be seen that because the product is mixed continuously while it is being heated, cool spots and hot spots are prevented. Mixing also maintains the chemical constituents in a state of agitation prior to the time the product is unified. It should also been seen that prior to the unification stage of the process, the product is usually fully cooked.

It was found that a product heated to a maximum of about 200° F. tended to be somewhat raw and uncooked in taste. The best results were obtained at temperatures of about 215° F. to about 240° F. while some products at a temperature of about 250° F. have a tendency to be overcooked.

It was also found that the amount of gas injected is not critical for brownie-like products. Injected gas has a tendency of course to lighten the product and to enable it to lose moisture more rapidly after extrusion.

The retention time within the continuous cooker has less effect on the finished product than the temperature at which cooking is carried out. Temperature and time are related in that at high temperatures less hold time will be required and vice versa. Once the product reaches the desired peak temperature, it can be held at this temperature one to several minutes without being damaged. The finished product is very uniform in consistency. Accordingly, product quality control is simplified. Moreover, the taste and texture of the finished product is quite similar to that of corresponding products made with the conventional hot air ovens or prepared in the kitchen.

What is claimed is:

1. A process for preparing relatively dense bakery goods characterized by the absence of a fixed structure and having one dimension of at least a few inches in length, said process comprising mixing saccharide, shortening, water and a member selected from the group consisting of cereal flour and starch to form a batter, providing a closed, heated cooking vessel in which mixing is conducted simultaneously with cooking substantially throughout the entire cooking process, causing the batter to flow continuously through the cooking vessel at a rate and for a period of time sufficient to elevate the temperature of the batter to between about 200° F. and 250° F. while in the cooking apparatus, scraping portions of the batter from heated surfaces of the cooking vessel and mixing the scraped batter with the cooler portions thereof, retaining the batter within the closed vessel for at least one minute, the application of heat in the vessel being of such a temperature to denature the proteins and gelatinize a fraction of the starch present, extruding the cooked product as a plastic mass that has a defined shape having one dimension of at least a few inches and a thickness of at least a quarter of an inch, unifying the product by supporting the cooked extruded material in a quiescent condition as it cools whereby the consistency of the composition becomes more firm and its shape and structure are retained.

2. The process of claim 1 wherein at least one surface of the material is irradiated with heat energy following the extrusion of said material to form a crust on said surface.

3. The process of claim 1 wherein the product is cooled following extrusion to remove at least a portion of the heat introduced during the cooking operation.

4. The process of claim 1 wherein the batter includes about three to six parts by weight of saccharides, about one to three parts by weight of flour, about one to three parts by weight of shortening for each 10 parts by weight of dry ingredients and sufficient moisture to bring the moisture content of the product to between about 10% and 30% by weight.

5. The process of claim 1 wherein the finished product comprises cookies and wherein supplemental heat is provided for irradiating the extruded cookies following the processing described in claim 1 and after being deposited upon the supporting surface, said cookies being exposed to the supplementary heat radiation to dry their exposed surfaces to a greater extent than the interior of the cookies.

6. The process of claim 1 wherein food compatible gas is injected into the batter and uniformly mixed therewith prior to extrusion of the batter onto the supporting surface to render the product porous.

7. A two stage cooking process for dense bakery goods comprising preparing a batter composed of saccharide, shortening, moisture and a member selected from the group consisting of cereal flour and starch, enclosing the product within a sealed vessel, heating the vessel while agitating the batter until the batter reaches a cooking temperature between about 200° F. and 250° F., retaining the batter within the vessel for between about one and ten minutes to thereby cook the batter in the vessel, expelling the cooked batter from the vessel, causing the consistency of the batter to be unified by supporting the cooked expelled batter in a quiescent condition and exposing at least one surface to radiant heat energy to dry the surface by an amount sufficient to produce a detectable change in the texture or flavor of said surface.

8. The process of claim 7 wherein a food compatible gas is introduced into and mixed with the batter before it is expelled from the vessel in which cooking and mixing take place.

References Cited

UNITED STATES PATENTS

| | | | |
|---|---|---|---|
| 2,054,937 | 9/1936 | Kremer | 99—90 |
| 2,524,437 | 10/1950 | Garnatz et al. | 99—92 |

RAYMOND N. JONES, Primary Examiner